(12) United States Patent
Sobiech et al.

(10) Patent No.: US 9,623,468 B2
(45) Date of Patent: Apr. 18, 2017

(54) COATING FOR HIGH TEMPERATURE APPLICATIONS WITH TRIBOLOGICAL STRESS

(71) Applicant: Oerlikon Surface Solutions AG, Trubbach, Trubbach (CH)

(72) Inventors: Matthias Lukas Sobiech, Wasserburg (DE); Jurgen Ramm, Maienfeld (CH)

(73) Assignee: OERLIKON SURFACE SOLUTIONS AG, PFÄFFIKON, Pfäffikon SZ (CH)

( * ) Notice: Subject to any disclaimer, the term of this patent is extended or adjusted under 35 U.S.C. 154(b) by 0 days.

(21) Appl. No.: 14/442,531

(22) PCT Filed: Nov. 11, 2013

(86) PCT No.: PCT/EP2013/003391
§ 371 (c)(1),
(2) Date: May 13, 2015

(87) PCT Pub. No.: WO2014/075787
PCT Pub. Date: May 22, 2014

(65) Prior Publication Data
US 2016/0067755 A1    Mar. 10, 2016

(30) Foreign Application Priority Data

Nov. 13, 2012 (DE) .................. 10 2012 022 114
Dec. 14, 2012 (EP) ..................... 12008340

(51) Int. Cl.
| | | |
|---|---|---|
| C10M 103/06 | (2006.01) |
| B21D 22/02 | (2006.01) |
| C10M 103/04 | (2006.01) |
| C01G 39/00 | (2006.01) |
| C08K 3/28 | (2006.01) |
| C08K 3/38 | (2006.01) |
| C09D 1/00 | (2006.01) |

(52) U.S. Cl.
CPC ........... *B21D 22/02* (2013.01); *C01G 39/006* (2013.01); *C08K 3/28* (2013.01); *C08K 3/38* (2013.01);
(Continued)

(58) Field of Classification Search
USPC .......... 51/307, 309; 428/336, 697, 698, 699, 428/704
See application file for complete search history.

(56) References Cited

U.S. PATENT DOCUMENTS

| | | | |
|---|---|---|---|
| 4,465,604 A | 8/1984 | King | |
| 4,554,201 A * | 11/1985 | Andreev | ............... C23C 28/044 428/698 |

(Continued)

FOREIGN PATENT DOCUMENTS

| | | |
|---|---|---|
| DE | 10 2010 053 751 A1 | 5/2012 |
| EP | 1 712 654 A1 | 10/2006 |

(Continued)

OTHER PUBLICATIONS

Liu et al "Synthesis and properties of nanocomposite MoSiN hard films" Surf & Coat. Techn. 201 (2006) p. 1894-1898.*

(Continued)

*Primary Examiner* — Archene Turner
(74) *Attorney, Agent, or Firm* — Pearne & Gordon LLP

(57) ABSTRACT

The present invention relates to a coating for high-temperature applications with tribological stress. The coating comprises a multi-layer system and a top lubrication layer, the top lubricant layer containing, as a main component, molybdenum.

12 Claims, 3 Drawing Sheets

Figure 1:
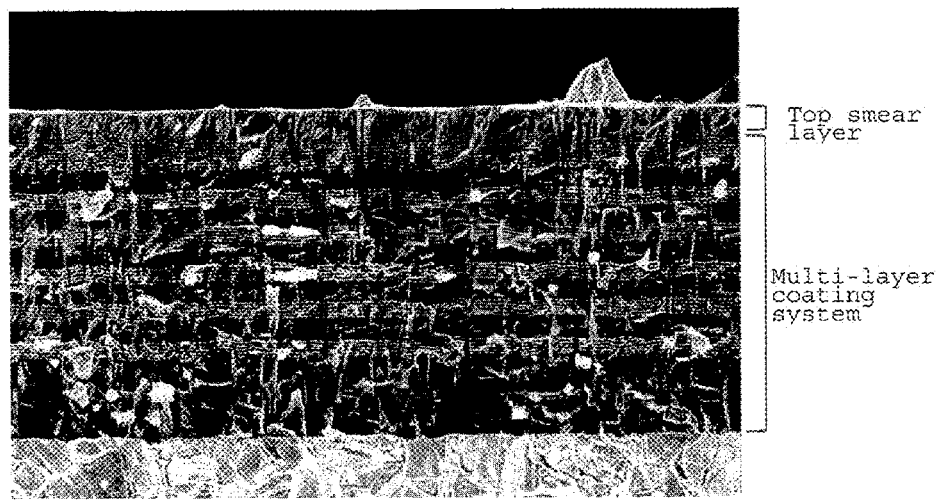

(52) U.S. Cl.
CPC ............ C09D 1/00 (2013.01); C10M 103/04 (2013.01); C10M 103/06 (2013.01); *C08K 2003/382* (2013.01); *C10M 2201/053* (2013.01); *C10M 2201/061* (2013.01); *C10M 2201/062* (2013.01); *C10M 2201/0613* (2013.01); *C10N 2210/01* (2013.01); *C10N 2210/04* (2013.01); *C10N 2210/05* (2013.01); *C10N 2210/06* (2013.01); *C10N 2230/06* (2013.01); *C10N 2230/08* (2013.01); *C10N 2230/14* (2013.01); *C10N 2240/10* (2013.01); *C10N 2240/14* (2013.01); *C10N 2240/40* (2013.01); *C10N 2240/401* (2013.01); *C10N 2240/402* (2013.01); *C10N 2240/404* (2013.01); *C10N 2240/407* (2013.01); *C10N 2240/58* (2013.01); *C10N 2250/14* (2013.01); *C10N 2250/141* (2013.01)

(56) References Cited

U.S. PATENT DOCUMENTS

| 4,619,865 A | * | 10/1986 | Keem | C23C 28/00 428/698 |
| 4,965,140 A | * | 10/1990 | Sarin | C23C 16/40 428/704 |
| 2010/0189835 A1 | * | 7/2010 | Yamamoto | C23C 14/0635 106/286.1 |
| 2013/0086881 A1 | * | 4/2013 | Joergensen | B21L 15/00 59/35.1 |
| 2013/0303414 A1 | | 11/2013 | Ramm | |

FOREIGN PATENT DOCUMENTS

| JP | 02-051433 | * | 2/1990 |
| WO | 2011/095292 A1 | | 8/2011 |

OTHER PUBLICATIONS

Hirvonen et al "Crystallization and oxidation behavior of Mo—Si—N coatings" Surf. & Coa. Techn 74-75 (1995) p. 981-985.*
A. Ozturk et al., "Comparative tribological behaviors of TiN-, CrN- and MoN—Cu nanocomposite coatings" ScienceDirect, Tribology International, vol. 41, 2008.
K.E. Pappacena et al., "Residual stresses, interfacial adhesion and tribological properties of MoN/Cu composite coatings" Wear, 2012.
Tomasz Suszko et al., "The role of surface oxidation in friction processes on molybdenum nitride thin films" ScienceDirect, Surface & Coatings Technology, vol. 194, 2005.

* cited by examiner

Top smear layer

Multi-layer coating system

COATING FOR HIGH TEMPERATURE APPLICATIONS WITH TRIBOLOGICAL STRESS

The present invention relates to wear resistance coatings for components, parts and tools that are exposed to high temperatures during use. Components, parts and tools are designated hereinafter together as substrates.

AIM OF THE INVENTION

Applications at "high" temperatures pose extreme challenges to the surface functionality of parts, components and tools in terms of their mechanical, structural and chemical stability. In order to attain a surface functionality that is stable over the long term and thus ensure the productivity of the industrial process, the present invention proposes hard material layer systems for parts, moving components as well as shaping and cutting tools, that improve in a satisfactory manner the wear and tear of the components and tools in different industrial applications with clearly increased heat stresses (i.e. temperatures of over 400° C., hereinafter called high-temperature uses). The fundamental properties of these hard material layer systems stable at high-temperatures are as follows: i) sufficient protection against abrasive wear, ii) sufficient protection against adhesive wear, iii) sufficient layer adhesion and iv) sufficient temperature stability (phase stability and resistance to oxidation).

DESCRIPTION OF THE INVENTION

According to the invention, a coating system is proposed which essentially comprises a multi-layer coating system as a basis. On this multi-layer coating system, a top smear coating system with at least one layer is provided. This top smear coating system finishes off the coating system externally. The top smear coating system contains molybdenum as its main component and, depending on the prevailing high temperature tribological contact and the mechanical and chemical stress of the surface resulting therefrom, can have an appropriate architecture/microstructure as well as a suitable composition.

Hereinafter, more details regarding the preferred architecture/microstructure and composition will be provided. To simplify, the top smear coating system is also called top smear layer.

Figure 2:
Figure 3:
Figure 4:
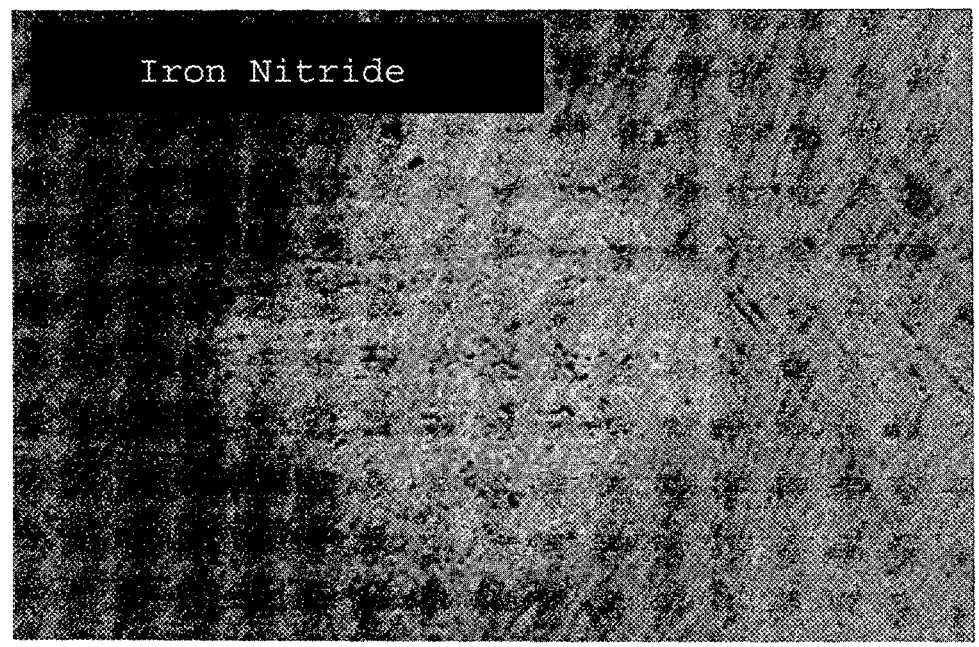
Figure 5:
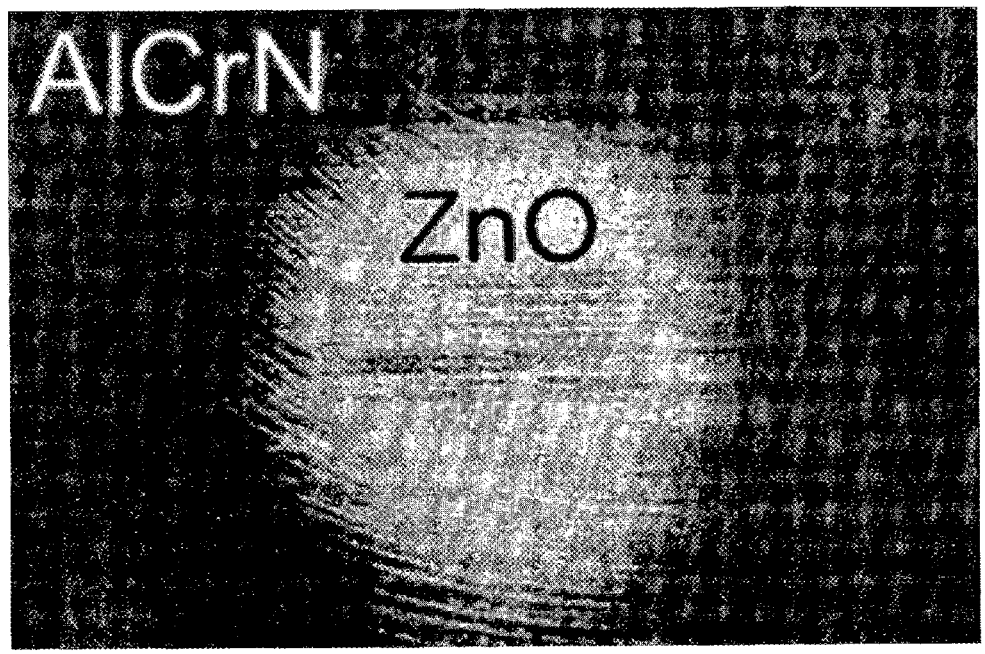
Figure 6:
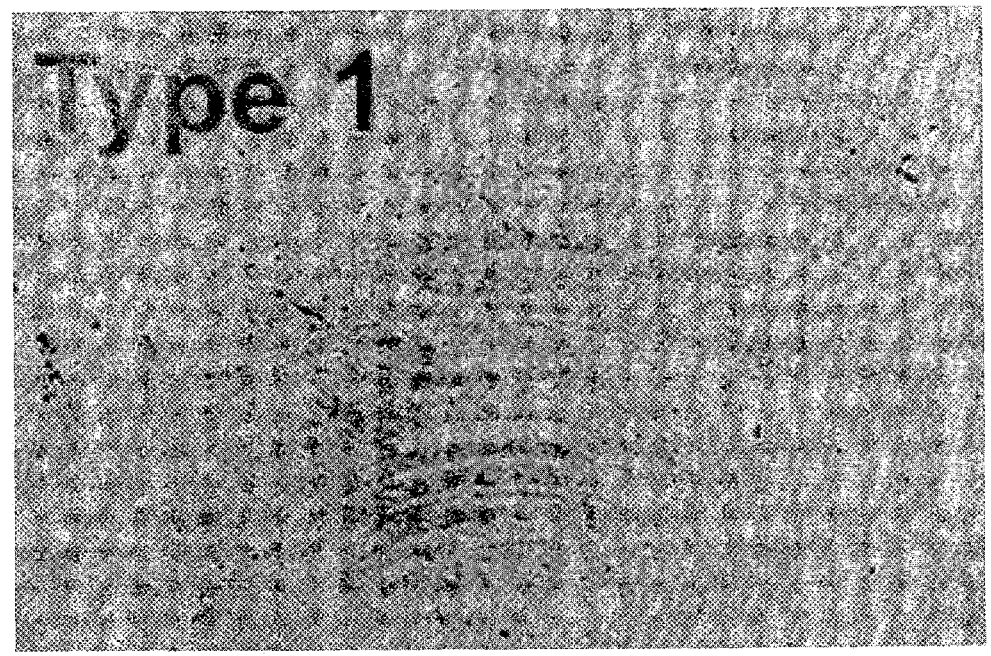

FIG. 1 shows an inventive coating;
FIG. 2 shows a detail of an inventive coating (nano-layers);
FIG. 3 shows a detail of an inventive coating (nano-layers);
FIG. 4 shows iron nitride;
FIG. 5 shows AlCrN and ZnO;
FIG. 6 shows type 1.

The architecture of this top smear layer can be characterized by i) a mono-layer configuration, ii) a bi-layer configuration, iii) a multi-layer configuration or iv) a nano-laminated configuration, wherein in case ii)-iv) the microstructure or the chemistry can be modified by means of the configuration. Gradations in the microstructure and/or the composition are however possible and appropriate in all cases i)-iv) in order to provide the lubricating behavior for the respective application in relation to the required mechanical properties. On all cases, the layers are essentially of a nanoscale nature.

The chemical composition of the top smear layer is generally characterized as follows: $Mo_2$—$X_b$—$Y_c$, wherein a, b and c indicate the atomic concentration of the respective components and $a+b+c=1$, and molybdenum is implemented as the dominating component, i.e. $0 \le b < a$ and $0 \le c < a$, wherein preferably $b+c>0$, with X being the variable metal component: B, Si, V, W, Zr, Cu and Ag or a combination thereof, with Y as variable non-metallic component: C, O and N or a combination thereof.

Top smear layers with the following compositions are particularly preferred for high-temperature applications above 500° C.:

Mo and/or Mo—Cu
Mo—N and/or Mo—Cu—N
Mo—O—N and/or Mo—Cu—O—N
Mo—Si—B and/or Mo—Si—B—N
Mo—Si—B—O—N The top smear layer preferably contains at least 95 at % molybdenum. Even more preferably, the top smear layer does not contain any aluminum. The layer thickness of the top smear layer is advantageously between 0.25 and 1.5 μm, even more advantageously between 0.5 and 1.0 μm.

In a preferred manner, a suitable pair of top smear layer and underlying coating system is evaluated for a specific high-temperature application (temperature, tribological contact, surrounding atmosphere and duration).

Hereinafter, the interaction of a Mo—X—Y top smear layer with an underlying multi-layer coating system will be explained by way of example. The mechanism of action of the top smear layer in combination with the underlying multi-layer coating system in respect of the mechanical, structural and chemical composition for various high-temperature applications can probably be described as follows: whilst the top smear layer is used exclusively in the initial stage of the tribological contact, in that this smear layer is continuously used at increased temperatures under formation of a solid lubricant phase (particularly metal oxides) and the tribological run-in behavior is optimized (i.e. the initial tribological contact is optimally conditioned for the further process), the underlying multi-layer coating system (after the surface conditioning has been performed through the top smear layer) becomes responsible for maintaining a protection (abrasive and adhesive) wear and tear protection that is long-lasting and stable at high temperatures. It must be assumed that at temperatures from approx. 400° C., the oxidation of the top smear layer starts (depending on the exact micro-structure and composition). The oxidation of the metals contained in the top smear layer, such as B, V, W, Zr, Cu, Ag and Mo, can result in the formation of so-called "Magnéli phases". It is known that such Magnéli phases have excellent lubricating properties (solid body lubrication). The underlying multi-layer coating system on the other hand, thanks to its architecture in tandem with the coating layer chemistry, provides not only the required mechanical, structural and chemical high-temperature stability but also the desirable and in the present case controllable formation of solid lubricant phases (especially metal oxides; it can result in the formation of so-called "Magnéli phases") in a stable long-term use at high temperatures up to 1000° C.

According to the invention, the multi-layer coating system comprises at least one layer stabilized for high temperatures (HT layer). One of these can correspond for example to (Me1, Me2, Mo)N.

In a particularly preferred embodiment of the present invention, the multi-layer coating system comprises at least two layer packets in which, as the distance from the substrate increases, an actively lubricating layer follows on a HT layer. An actively lubricating layer can correspond to the HT layer, yet be formed with an increased proportion of molybdenum. The layers low in molybdenum accordingly would form the HT layers whilst the molybdenum-rich layers can form the lubricating layers. Preferably, the maximum molybdenum concentration in the molybdenum-rich layers is at least 10 at %, even more preferably at least 20 at % over the minimum molybdenum concentration of the neighboring layers low in molybdenum. The molybdenum-rich layers of the alternating layer system can be deposited for example by means of a PVD process using individual component material sources (targets) as well as by means of a PDV process using multi-components material sources.

The molybdenum-rich layers of the alternating layer system can contain one or several further elements from the group comprising C, O, B, Si, V, W, Zr, Cu and Ag in order to further improve lubrication.

The layers low in molybdenum of the alternating system can contain one or several further elements from the group comprising B, Si, W and Zr and their combinations in order to further improve the high-temperature stability, e.g. by improving the mechanical and chemical properties.

According to the invention, a top smear layer as indicated above is applied on this multi-layer coating system.

Inventive substrates, i.e. substrates coated with the inventive coating system, can advantageously be used anywhere where high temperatures and tribological stress might arise during use. This is for example the case for direct press hardening. By way of example, the following are mentioned:

Direct press hardening of Al—Si coated 22MnB5 USSH sheets

Direct press hardening of uncoated 22MnB5 USSH sheets

Direct press hardening of ultra-high-strength steels of the type 22MnB5 that are coated with Zn-based coats Further examples of applications are forging of high-strength metal sheets cutting and deformation in particular of high-strength titanium and nickel alloys components and moving parts in internal combustion engines and in the field of turbochargers aluminum and magnesium die casting injection molding and extrusion especially of high-strength plastics or aluminum According to a first embodiment of the present invention, a 2 µm thick $(Ti_{0.5}Al_{0.5})N$ layer is applied onto a hard-press forming tool. This is followed by 5 layer packets, wherein each layer packet comprises a 0.5 µm thick $(Ti_{0.3}Al_{0.3}Mo_{0.4})N$ layer, followed by a 0.5 µm thick $(Ti_{0.5}Al_{0.5})N$ layer. A 0.5 µm thick $(Ti_{0.3}Al_{0.3}Mo_{0.4})N$ layer completes this multi-layer coating system. The overall coating system, on the other hand, is completed with a 0.5 µm thick $Mo_{0.05}Si_{0.03}B_{0.02}$ as top smear layer. In this concrete case, MoN and $Mo_{0.05}Cu_{0.05}N$ are particularly relevant as suitable top smear layers.

According to a second embodiment of the present invention, a 2 µm thick $(Al_{0.65}Cr_{0.25}Si_{0.05})N$ layer is applied onto a hard-press forming tool, wherein Si can optionally also be omitted. This is followed by 5 layer packets, wherein each layer packet comprises a 0.5 µm thick $(Al_{0.42}Cr_{0.8}Mo_{0.35}Cu_{0.05})N$ layer, followed by a 0.5 µm thick $(Al_{0.7}Cr_{0.3})N$ layer. A 0.5 µm thick $(Al_{0.42}Cr_{0.18}Mo_{0.35}Cu_{0.05})N$ layer completes this multi-layer coating system. The overall coating system, on the other hand, is completed with a 0.5 µm thick MoN as top smear layer.

Particularly preferred furthermore is a coating with a multi-layer coating system comprising compounds (C and/or N and/or O) of Al and B and the elements of the IV and V subgroup on the one hand and Mo compounds (C and/or B and/or N and/or O) on the other hand, and with a top smear layer containing a Mo compound with Mo as main component, and with a thickness that is the same, or preferably greater, than the molybdenum-containing layers in the multi-layer.

Particularly preferred is the coating with the multi-layer coating system as above, wherein the integral proportion of Mo to the total proportion of the metals is less than 50 at %.

Further experiments have led to the following characteristics of particularly preferred embodiments of the present invention:

The actively lubricating layers (TiAlMoN) advantageously have an (averaged; when measured by EDX at 10 kV) Mo content of 20-60 mat %, preferably 25-35 at %, even more preferably 30 at %.

The (averaged) Mo content may also be controlled via the architecture (nano-layer structure) of the actively lubricating layers (see pictures below). This can be achieved technically by using 2 target types (Mo and TiAl) through i) a change in the rotational speed and/or ii) a change of the target parameters of all targets running simultaneously.

The thickness of the MoN-rich layers in the TiAlMoN (light layers in the nano-layer) may vary between 10-60 nm, preferably between 20-50 nm, more preferably between 30-40 nm. The optimum thickness of the MoN-rich layers in TiAlMoN seems to be about 40 nm.

A Mo content of about 30 at % in the actively lubricating layers (TiAlMoN) can at temperatures of 800-900° C. very advantageously promote surface oxidation (without adversely affecting the total layer structure), so that sufficient (oxide) lubricant is always provided in order to prevent a smearing of AlSi during long-term use. This has been shown by application-focused tests (e.g. HT-SRV test with continuous change of Usibor®-sheet with the same layer being always tested).

Very advantageous is also the fact that when the Mo content is varied in the range of 20-40 at % in the actively lubricating layers (TiAlMoN), the mechanical properties (hardness, modulus of elasticity, adhesion), the structural properties (phase composition) as well as the oxidation properties (growth of an oxide layer at 800° C. for 1 h in ambient atmosphere) of the overall layer are not significantly altered. This allows the targeted architecture and composition for various HT applications in terms of resistance against abrasive and adhesive wear and tear to be optimized.

As mentioned above, steel sheets of the type 22MnB5 coated with Al—Si are currently state of the art in the field of direct press hardening of ultra-high-strength steels for use in the automobile construction (e.g. center pillar/B-pillar). During austenitisation (T>900° C.) in ambient atmosphere, Al—Si steel coatings prevent the scaling (formation of iron oxide) of the steel surface and provide sufficient protection against corrosion (passive boundary layer effect) as compared to uncoated steel sheets.

In order however to fulfill the increasingly growing requirements made in terms of protection against corrosion in the context of press hardening, Zn-based steel coatings have more recently gained increased attention in ongoing developments. These Zn-based steel coatings, in addition to avoiding high-temperature scaling, afford a very effective cathodic protection against corrosion (Zn is less noble than Fe, so that under corrosion conditions in the galvanic element, Zn represents the anode and Fe is the cathode—this is called cathodic corrosion protection). There are however significant problems that arise during the direct press hardening for example of Zn-based ultra-high-strength steels of the type 22MnB5;

abrasive tool wear and tear through the formation of zinc oxide adhesive tool wear and tear through the strong adhesion of zinc oxide crack formation in the Zn-based steel coatings up to within the steel sheet during direct press hardening following high mechanical stress during forming The formation of cracks in particular is a central problem. The question now arises as to whether the crack formation can be prevented during direct press hardening if the boundary surface tribology between the tool surface and the steel sheet surface is optimized, i.e. if the boundary surface friction is reduced. The aim is thus to propose a tool coating that is capable of significantly reducing the tool wear and tear on the one hand and the friction value on the other hand.

In view of the above situation, further tests were performed with Zn-based steel coatings. In this respect, application-oriented tribological tests at high temperatures (e.g. HT-SRV tests) were performed in order to obtain evidence as to layer wear and tear and as to the friction value. After seasoning the Zn-coated steel sheets at approx. 880° C. for 10 minutes, the temperature was lowered to 700° C. and the coated SRV specimens (with the coating to be examined) was applied with a load of 10N onto the hot steel surface. Subsequently, the tribological test was performed in oscillating mode for 2.5 minutes. The friction value was measured directly and the traces of wear were examined using a scanning electron microscope and calotte grinding as to adhesive and abrasive wear and tear. The adhesive wear was classified subjectively (1=no material smearing up to 5=significant material smearing) and the abrasive wear was determined in absolute value in % normalized to a layer thickness of 8 µm.

The inventive coating system was tested in two variants against the benchmark coatings of iron nitride (nitrified steel surface with bonding layer) and AlCrN.

Description of variant 1 (type I): $(Mo_{0.95}Cu_{0.05})N$ as top layer with a layer thickness of approx. 0.5 µm on a multi-layer coating system with the following structure: a 2 µm thick $(Ti_{0.5}Al_{0.5})N$ layer is followed by 5 layer packets, wherein each layer packet contains a 0.5 µm thick $(Ti_{0.3}Al_{0.3}Mo_{0.4})N$ layer followed by a 0.5 µm thick $(Ti_{0.5}Al_{0.5})N$ layer. This multi-layer coating system is completed with a 0.5 µm thick $(T_{0.3}Al_{0.3}Mo_{0.4})N$ layer.

Description of variant 2 (type II): MoN as top layer with a layer thickness of approx. 0.5 µm on a multi-layer coating system with the following structure: a 2 µm thick $(Ti_{0.5}Al_{0.5})N$ layer is followed by 5 layer packets, wherein each layer packet contains a 0.5 µm thick $(Ti_{0.3}Al_{0.3}Mo_{0.4})N$ layer followed by a 0.5 µm thick $(Ti_{0.5}Al_{0.5})N$ layer. This multi-layer coating system is completed with a 0.5 µm thick $(Ti_{0.3}Al_{0.3}Mo_{0.4})N$ layer.

Both variants of the inventive coating system exhibit a very low adhesive wear and tear as well as a significantly reduced friction value as compared with the benchmark coatings.

After the 2.5 minute test, a certain abrasive wear is to be seen only for the iron nitride. Very surprising is also the fact that the variant 2 of the inventive coating system after 10 successively performed 2.5 minute tests exhibited an unchanged superior performance. These results clearly show that the inventive coating system has very high potential also for industrial long-term use.

What is claimed is:

1. Coating with a top smear layer with essentially the composition Mo—Si—B and/or Mo—Si—B—N or Mo—Si—B—O—N.

2. Coating according to claim 1, characterized in that the architecture of the top smear layer has a mono-layer or a bi-layer or a multi-layer or a nano-laminated configuration.

3. Coating according to claim 2, characterized in that the architecture of the top smear layer has a bi-layer or a multi-layer or a nano-laminated configuration and in that the microstructure can be modified by means of the configuration.

4. Coating according to claim 2, characterized in that the architecture of the top smear layer has a bi-layer or a multi-layer or a nano-laminated configuration and in that the chemistry can be modified by means of the configuration.

5. Coating according to claim 1, characterized in that the top smear layer contains at least 95 at % molybdenum.

6. Coating according to claim 1, characterized in that the layer thickness of the top smear layer is between 0.25 µm and 1.5 µm.

7. Apparatus comprising a substrate at least partly covered with a coating according to claim 1.

8. Apparatus according to claim 7, characterized in that the substrate is a tool.

9. Apparatus according to claim 8, characterized in that the tool is a press hardening forming tool.

10. Apparatus according to claim 9, characterized in that below the top smear layer of the coating, at least one layer of titanium aluminum nitride is provided.

11. Apparatus according to claim 10, characterized in that the top smear layer has essentially a chemical composition $Mo_{0.95}Si_{0.03}B_{0.02}$ and/or the titanium aluminum layer has essentially a chemical composition $Ti_{0.5}Al_{0.5}N$.

12. A method of using an apparatus according to claim 9 comprising direct press hardening of:
Al—Si coated 22MnB5 USSH sheets, or
uncoated 22MnB5 USSH sheets, or
ultra-high-strength steels of the type 22MnB5 that are coated with Zn-based layers.

* * * * *

UNITED STATES PATENT AND TRADEMARK OFFICE
CERTIFICATE OF CORRECTION

PATENT NO. : 9,623,468 B2
APPLICATION NO. : 14/442531
DATED : April 18, 2017
INVENTOR(S) : Matthias Lukas Sobiech et al.

It is certified that error appears in the above-identified patent and that said Letters Patent is hereby corrected as shown below:

In the Specification

Column 3, Line 58-59, replace "$(Al_{0.42}Cr_{0.8}Mo_{0.35}Cu_{0.05})$" with -- $(Al_{0.42}Cr_{0.18}Mo_{0.35}Cu_{0.05})$ --.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*